(12) United States Patent
McKinnon

(10) Patent No.: US 10,279,270 B1
(45) Date of Patent: May 7, 2019

(54) FANTASY SPORT SYSTEM

(71) Applicant: Roy McKinnon, La Canada Flintridge, CA (US)

(72) Inventor: Roy McKinnon, La Canada Flintridge, CA (US)

(*) Notice: Subject to any disclaimer, the term of this patent is extended or adjusted under 35 U.S.C. 154(b) by 0 days.

(21) Appl. No.: 15/685,529

(22) Filed: Aug. 24, 2017

Related U.S. Application Data

(60) Provisional application No. 62/378,886, filed on Aug. 24, 2016.

(51) Int. Cl.
 A63F 13/35 (2014.01)
 A63F 13/828 (2014.01)
 A63F 13/65 (2014.01)

(52) U.S. Cl.
 CPC ............ *A63F 13/828* (2014.09); *A63F 13/35* (2014.09); *A63F 13/65* (2014.09)

(58) Field of Classification Search
 None
 See application file for complete search history.

(56) References Cited

U.S. PATENT DOCUMENTS

| | | | | |
|---|---|---|---|---|
| 9,984,535 | B2* | 5/2018 | Odom | G07F 17/3288 |
| 2010/0184495 | A1* | 7/2010 | Levy | A63F 13/12 |
| | | | | 463/4 |
| 2013/0167162 | A1* | 6/2013 | Fernandez | G06F 17/3089 |
| | | | | 719/328 |
| 2016/0051895 | A1* | 2/2016 | Hood | A63F 13/35 |
| | | | | 463/29 |
| 2017/0098348 | A1* | 4/2017 | Odom | G07F 17/3288 |

* cited by examiner

*Primary Examiner* — Ronald Laneau
(74) *Attorney, Agent, or Firm* — Stefan J. Kirchanski; Matthew J. Spark; Zuber Lawler & Del Duca LLP

(57) ABSTRACT

An automated fantasy sports system is rule driven. Rules provide for substitution of players during play. Substitution is allowed only at discrete time periods which are defined for each sport. Rules govern the accumulation of points. When a player is substitute out, the player continues to accumulate points until the end of the discrete time period. The player that is substituted in does not accrue points until the beginning of the next discrete time period.

1 Claim, 16 Drawing Sheets

FIG. 1

| POS | NAME | GAMETIME |
| --- | --- | --- |
| QB | C. NEWTON | 1PM SUNDAY |
| RB | A. PETERSON | 1PM SUNDAY |
| RB | T. GURLEY | 4PM SUNDAY |
| WR | J. JONES | 4PM SUNDAY |
| WR | J. NELSON | 1PM SUNDAY |
| TE | R. GRONKOWSKI | 8PM MONDAY |
| FLEX | J. CHARLES | 4PM SUNDAY |
| K | S. GOSTKOWSKI | 8PM MONDAY |
| DEF | CAROLINA | 8PM THURSDAY |

SUBSTITUTES

| POS | NAME | GAMETIME |
| --- | --- | --- |
| QB | A. RODGERS | 1PM SUNDAY |
| RB | L. BELL | 4PM SUNDAY |
| WR | J. EDELMAN | 8PM MONDAY |
| TE | G. OLSON | 8PM THURSDAY |

FIG. 2

| PLAYER | POS | GAME CLOCK | FANTASY POINTS | |
|---|---|---|---|---|
| C. NEWTON | QB | 1:34  2ND Q | 1Q | 13 |
| | | | 2Q | 7 |
| | | | 2M | 0 |
| | | | 3Q | — |
| | | | 4Q | — |
| | | | 2M | — |

| PLAYER | POS | GAME CLOCK | FANTASY POINTS | |
|---|---|---|---|---|
| A. RODGERS | QB | 1:06  2ND Q | 1Q | 0 |
| | | | 2Q | 0 |
| | | | 2M | 0 |
| | | | 3Q | — |
| | | | 4Q | — |
| | | | 2M | — |

FIG. 3

| PLAYER | POS | GAME CLOCK | FANTASY POINTS | |
|---|---|---|---|---|
| C. NEWTON | QB | 1:06  2ND Q | 1Q | 13 |
| | | | 2Q | 7 |
| | | | 2M | 2 |
| | | | 3Q | — |
| | | | 4Q | — |
| | | | 2M | — |

| PLAYER | POS | GAME CLOCK | FANTASY POINTS | |
|---|---|---|---|---|
| A. RODGERS | QB | 0:56  2ND Q | 1Q | 0 |
| | | | 2Q | 0 |
| | | | 2M | 0 |
| | | | 3Q | — |
| | | | 4Q | — |
| | | | 2M | — |

| PLAYER | POS | GAME CLOCK | FANTASY POINTS | |
|---|---|---|---|---|
| A. RODGERS | QB | 3:12  4Q | 1Q | 0 |
| | | | 2Q | 0 |
| | | | 2M | 0 |
| | | | 3Q | 15 |
| | | | 4Q | 7 |
| | | | 2M | — |

| PLAYER | POS | GAME CLOCK | FANTASY POINTS | |
|---|---|---|---|---|
| C. NEWTON | QB | 4:58  4Q | 1Q | 13 |
| | | | 2Q | 7 |
| | | | 2M | 2 |
| | | | 3Q | 0 |
| | | | 4Q | 0 |
| | | | 2M | — |

FIG. 4A

| PLAYER | POS | GAME CLOCK | FANTASY POINTS | |
|---|---|---|---|---|
| C. NEWTON | QB | 1:19   4Q | 1Q | 17 |
| | | | 2Q | 6 |
| | | | 2M | 3 |
| | | | 3Q | 14 |
| | | | 4Q | 4 |
| | | | 2M | 0 |

FIG. 5

| PLAYER | POS | GAME CLOCK | FANTASY POINTS | |
|---|---|---|---|---|
| C. NEWTON | QB | 12:56 4TH Q | 1Q | 7 |
| | | | 2Q | 10 |
| | | | 2M | 3 |
| | | | 3Q | 10 |
| | | | 4Q | 5 |
| | | | 2M | — |

| PLAYER | POS | GAME CLOCK | FANTASY POINTS | |
|---|---|---|---|---|
| A. RODGERS | QB | 0:00  4Q | 1Q | 0 |
| | | | 2Q | 0 |
| | | | 2M | 0 |
| | | | 3Q | 0 |
| | | | 4Q | 0 |
| | | | 2M | 0 |

FIG. 6

| PLAYER | POS | GAME CLOCK | FANTASY POINTS | |
|---|---|---|---|---|
| C. NEWTON | QB | 1:34 2ND Q | 1Q | 13 |
| | | | 2Q | 7 |
| | | | 2M | 0 |
| | | | 3Q | — |
| | | | 4Q | — |
| | | | 2M | — |

| PLAYER | POS | GAME CLOCK | FANTASY POINTS | |
|---|---|---|---|---|
| A. RODGERS | QB | 4PM SUNDAY | 1Q | 0 |
| | | | 2Q | 0 |
| | | | 2M | 0 |
| | | | 3Q | — |
| | | | 4Q | — |
| | | | 2M | — |

FIG. 6B

| PLAYER | GAME CLOCK | FANTASY POINTS | |
|---|---|---|---|
| QUARTERBACK A | 1PM SUNDAY | 1Q | NA |
| | | 2Q | A |
| | | 2M | NA |
| | | 3Q | NA |
| | | 4Q | A |
| | | 2M | NA |

| | | FANTASY POINTS | |
|---|---|---|---|
| QUARTERBACK B | 1PM SUNDAY | 1Q | A |
| | | 2Q | NA |
| | | 2M | NA |
| | | 3Q | A |
| | | 4Q | NA |
| | | 2M | NA |

| | | FANTASY POINTS | |
|---|---|---|---|
| QUARTERBACK C | 4PM SUNDAY | 1Q | NA |
| | | 2Q | NA |
| | | 2M | A |
| | | 3Q | NA |
| | | 4Q | NA |
| | | 2M | A |

FIG. 7

| | | |
|---|---|---|
| QUARTERBACK A | 1Q | 7 |
| | 2Q | 13 |
| | 2M | NA    (NOT ACTIVE) |
| | 3Q | NA |
| | 4Q | NA |
| | 2M | 6 |
| | TOTAL POINTS | 26 |

| | | |
|---|---|---|
| QUARTERBACK B | 1Q | NA |
| | 2Q | NA |
| | 2M | 4 |
| | 3Q | 12 |
| | 4Q | 6 |
| | 2M | NA |
| | TOTAL POINTS | 22 |

QUARTERBACK A (26) + QUARTERBACK B (22) = 48 POINTS FOR THE POSITION

FANTASY SPORT SYSTEM

CROSS-REFERENCE TO PRIOR APPLICATIONS

The present application is based on and claim priority and benefit of U.S. Provisional Patent application No. 62/378,886 which was filed on 24 Aug. 2016.

U.S. GOVERNMENT SUPPORT

Not applicable

BACKGROUND OF THE INVENTION

Area of the Art

The present application is in the area of fantasy sports and more specifically discloses a new way of handling player substitutions.

Description of the Background Art

The general rules of fantasy sports are well-known. A participant assembles a fantasy team by selecting players from actual current spots teams. Selections are made based on statistical performance of various players as well as "gut feelings" of the participant. The goal is to beat other teams in the same fantasy league or tournament. Each fantasy team accrues points based on the points earned by the team players in actual competitions with their "real" teams.

Currently, all fantasy sports leagues and contests (daily, weekly or seasonal) are non-interactive once the contest games begin. In standard contests, participants select a starting lineup before the games begin. Once each player's real games begin, fantasy contestants await the outcome of each player's performance. This new fantasy sport system allows fantasy contestants to take more control of their teams and games. Instead of idly watching, contestants can actually participate in the outcome of the game by moving players in and out of their active lineup as the games progress in order to give them the (hopefully) best chance of winning. There are several reasons a contestant might want to make a change to their active lineup including: weather changes, injury, performance, game tempo, player ejections as well as analysis of other contestants active lineups and scores. Unfortunately, no current system allows interactivity.

SUMMARY OF THE INVENTION

An automated, rule-driven system implements fantasy sport competition in a variety of sports. A network-connected server or servers maintains and displays (through a personal computer, smart phone, tablet computer or the like) the contestants choices (e.g., rosters) as well as automatically accumulating and displaying the points earned. The rules specifically allow substitution of players after a contest has begun. The computer implemented rules control the substitution process. To facilitate score-keeping the substitution is allowed only during certain discrete time periods which are defined for each potential fantasy sport. In the case of football the discrete period is within an active quarter but prior to the two minute warning. Accessory rules particular to each implementation may define additional controls on substitution, but the general rule is that when player A is substituted out replaced by player B, player A will continue to accrue points until the end of the discrete period in player A's actual game. That is, even though Player A is "out," he will still accumulate points for his contestant. Player B, however, will not begin to accumulate points until the beginning of the next discrete period in player B's actual game. That is, total fantasy points for each position is an accumulation of the periods in which each fantasy players in a particular position was active. In addition, the rules allow optional automatic substitution of preselected players upon occurrence of predetermined events in the actual games. For example, if a player is injured in an actual game, that player will be automatically replaced in the fantasy game by one of the contestant's listed substitutes.

DESCRIPTION OF THE FIGURES

FIG. 1 shows a roster after a contestant has selected the starting and substitute players in a Fantasy Football game;

FIG. 2 is a diagram showing how a substitution is made;

FIG. 3 shows how a contestant can switch a player in and out of the active lineup multiple times during a contest;

FIG. 4 shows a fourth quarter substitution; FIG. 4A shows when substitution is not allowed.

FIG. 5 is another example of when a substitution cannot be made;

FIG. 6 is an example of how a substitution made even if one of the player's games has not begun;

FIG. 6B shows how a substitution can be pre-made and how the fantasy points then accrue;

FIG. 7 is a diagram explaining is an example of how a position's point totals accumulate to a final score;

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved Fantasy Sport System.

This patent application discloses a new fantasy sports system that allows interactivity through player substitution and other roster revisions. Compared to the standard fantasy league, the ability to make substitutions adds considerable complexity to scoring. In standard games, a fantasy player accumulates points based on the points that player earns in a real game. If substitutions are made, the player will accrue points only for the time the player is active in the fantasy game. That is, the points earned by the fantasy team might be only a fraction of the points earned by the player in the real game. While it is conceivable that the exact minute of the substitution (versus the game clock) could be used to control the scoring, this is extremely complex to implement. Substitution rules and restrictions could be custom made for each different league and sport, but the inventive system simplifies things and makes them more comprehensible by requiring that any substitutions be made at a definitive break in action that occurs at the SAME TIME in each real game:

Football=end of a quarter; two minute warning in second and fourth quarters
Basketball=end of a quarter;
Hockey=end of a period;
Baseball=end of each at bat and/or each inning;
Golf=end of each hole; and
Soccer=end of each half.

Figure 4B:
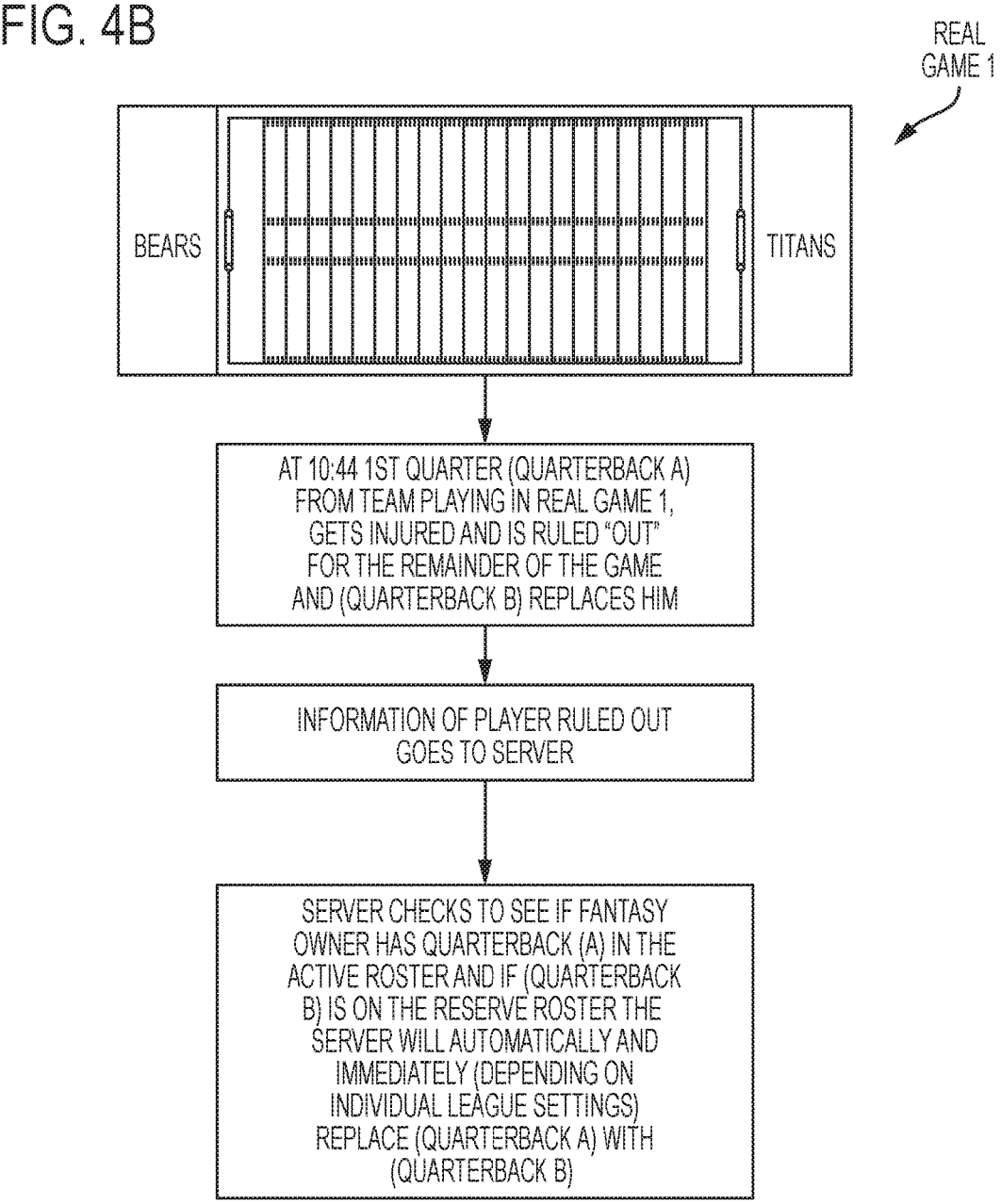
FIG. 4B is an example of an automatic substitution option.

Limiting substitutions to definitive breaks that happen in every game keeps substitutions as fair as possible for all contestants and limits the ability to take advantage of the system in an unsportsmanlike manner. The number of roster reserves, roster salaries, substitutions allowed, etc. are customizable rules determined by each individual league and their contestants. According to the present invention, the following are the important rules that clearly define substitution requirements:

Rules:
1) Fantasy players can be moved from the active to reserve roster throughout the competition as many times as the player's eligibility allows. FIG. 1 shows a possible roster after the players have been selected by a contestant—both starters and substitutes, but before the game has begun.
2) Fantasy player substitutions can be made at any time but will only go into effect at the start of the next eligible time period (in the real game) for the player substituting "in" (See FIG. 2—if the contestant decides to substitute (Quarterback Newton) out of his game at the 1:34 mark of the second quarter for (Quarterback Rodgers) who is also in the second quarter of his game, then the actual switch will take place at the beginning of the third quarter of Quarterback Rodger's game). Players continue to accumulate points until their substitution time period ends (If Quarterback Newton and Quarterback Rodgers are both in the second quarter of their real games, and a substitution is made, Quarterback Rodgers would not accrue points until the third quarter of his game. Quarterback Newton will continue to accrue points until the end of the second quarter of his game, while Quarterback Rodgers will start to accrue points at the beginning of the third quarter of his game.).
3) If Quarterback Newton is subbed midway through the second quarter, Quarterback A continues to accrue points for the rest of the second quarter and Quarterback Rodgers (who was subbed in) starts accruing points in the third quarter of his game. (See FIG. 3—in this example, the contestant decides to substitute Quarterback Rodgers for Quarterback Newton during the second quarter. Later in the contest, the contestant decides to substitute Quarterback Newton for Quarterback Rodgers prior to the two minute warning (2M) in either player's game. as long as there is an eligible next period of play, such substitutions can be made.).
4) Players can be substituted in and out of the active roster as often as the eligibility requirements allow; FIG. 4A is an example of when a substitution is not allowed. Because Quarterback Newton's game has passed the two minute warning in the final period of his game, there is no "next" eligible period of play for a substitution to occur since the fourth quarter is the final regulation period in an NFL game. The same would apply to other final periods of play for other sports: soccer (second half), hockey (third period), basketball (fourth quarter) etc.
5) Fantasy players can't be substituted if they have entered the final period of regulation play in their respective sports. However, there are two exceptions to this rule: a) the first exception is in football, where the two minute warnings of the second and fourth quarters are treated as eligible periods for substitution; and b) the second exception is the case where the automatic substitution option is activated. If an active player gets injured or ejected or if his game is suspended or cancelled, the system will automatically substitute with an eligible player from the reserve roster at the next available substitution period. In the event of a cancelled baseball game, the substituting player can be eligible to accrue points from the first period of scoring instead of the next available period of scoring so that the contestant is not at a decided disadvantage if waiting for games to get cancelled as other games progress. This can be especially important for fantasy baseball, in the event a game gets cancelled due to weather because substitutions for those players in the cancelled games can be readily arranged. As shown in FIG. 4B in fantasy football if Quarterback A is injured and determined "out" for the remainder of the game, declared inactive, or ejected then the system will automatically substitute Quarterback A with Quarterback B. If there is a player eligible at that position to substitute from the reserve roster, an automatic substitution will be made. A variation of this rule is if the contestant has a player on the reserve roster that plays for the same team then a substitution could be made immediately instead of having to wait for the start of the next period. In other words, if Quarterback A and Quarterback B play for the same team, their game time's would match exactly and thus a seamless automatic substitution is possible. FIG. 5 shows an example of when an automatic substitution is not possible because the incoming substitute is not eligible. Quarterback Newton's game is at the 12:56 time of the fourth quarter so he is eligible to be substituted out at the two minute warning. However, Quarterback Rodgers' game has passed the two minute warning thus making him ineligible for substitution.
6) A Player cannot be substituted in or out of the lineup if the real game for either of the players has been completed.
7) Players are eligible for substitution even if their game has not yet begun. This is shown in FIG. 6. Quarterback Newton's game is at the 1:34 mark of the second quarter and Quarterback Rodger's game has not begun yet. The contestant can still make a substitution. Quarterback Newton will accrue points until the end of the second quarter of his game. Quarterback Rodgers would be ineligible to accrue points in the first and second quarters of his game when it begins but will start to accrue points at the beginning of the third quarter of his game. FIG. 6B is an example of how a contestant can predetermine substitutions before any of the games begin. In this example, the contestant selects Quarterback A to play the second and fourth quarters and Quarterback B to play the first quarter and third quarter and Quarterback C would play the two minute mark of the second quarter and the two minute mark of the fourth quarter. the system will automatically make these substitutions at the correct timings.
8) Total fantasy points for each position is an accumulation of the periods in which each fantasy players in a particular position was active. FIG. 7 shows an example. Quarterback A plays the first and second quarters as well as the two minute period of the fourth quarter; his point totals for the active periods is 26. Quarterback B plays the two minute period of the second quarter as well as the third quarter and the fourth quarter until the two minute period; his point total is 22. The total points for the position is computed by adding Quarterback A's points (26) and Quarterback B's points (22) for a total of 48 points for the position.

9) Players only accumulate points when they are active in the fantasy lineup; because of the complexity of the scoring, it is essential for the software system to carry out certain functions, thereby properly accumulating each contestant's points while updating each contestant's lineup.

Figure 8:
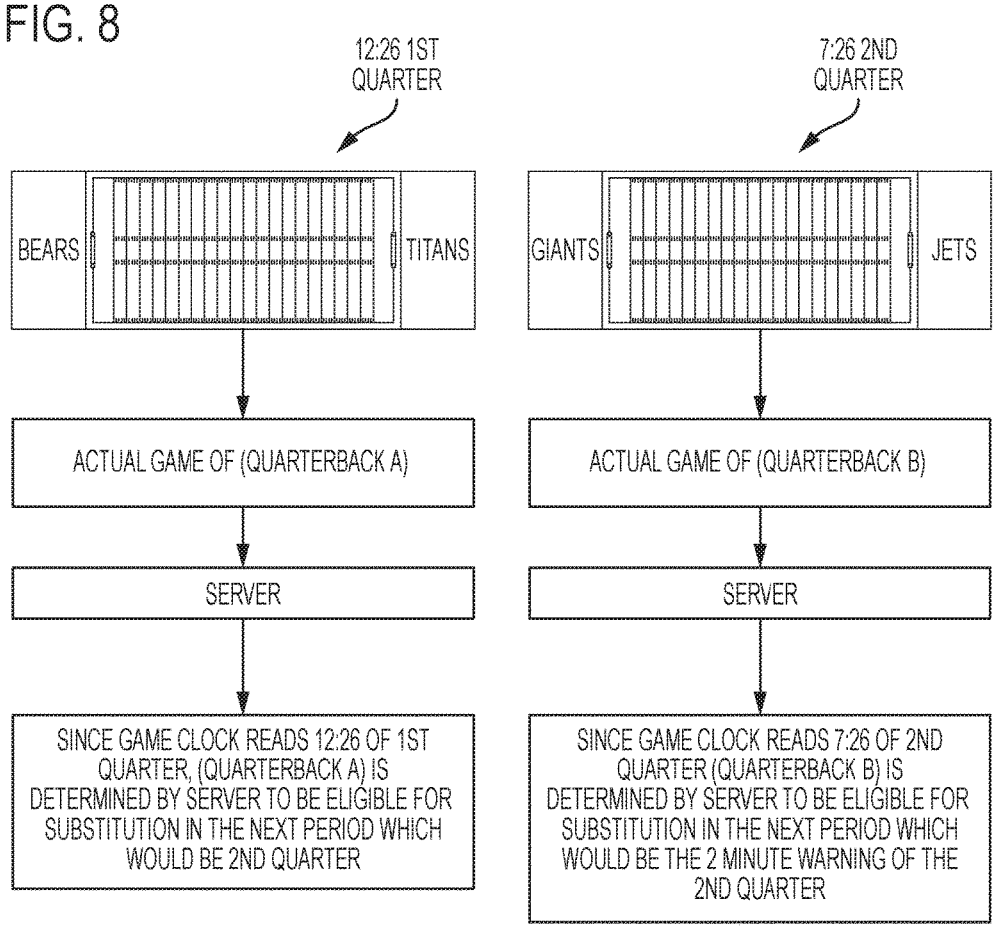
FIG. 8 is a diagram showing how the system monitors each game clock in the real game being played by each fantasy player.

Software System Functions/Responsibilities:

1) The software system is responsible for keeping track of and determining periods the eligibility for each fantasy player on the roster for all fantasy team owners (participants/contestants). Player eligibility is determined by the game clock in the actual game being played by each fantasy player, as shown in FIG. 8. The system uses this game clock to determine when players will be eligible to be substituted. In this example Quarterback A's game clock is at 12:26 of the first quarter. Therefore, the system determines that the next available time to be substituted would be the two minute timeout of the second quarter (see FIG. 2 as well).

2) The system is responsible for keeping track of fantasy points accumulated for each position when that player is active.

Figure 9:
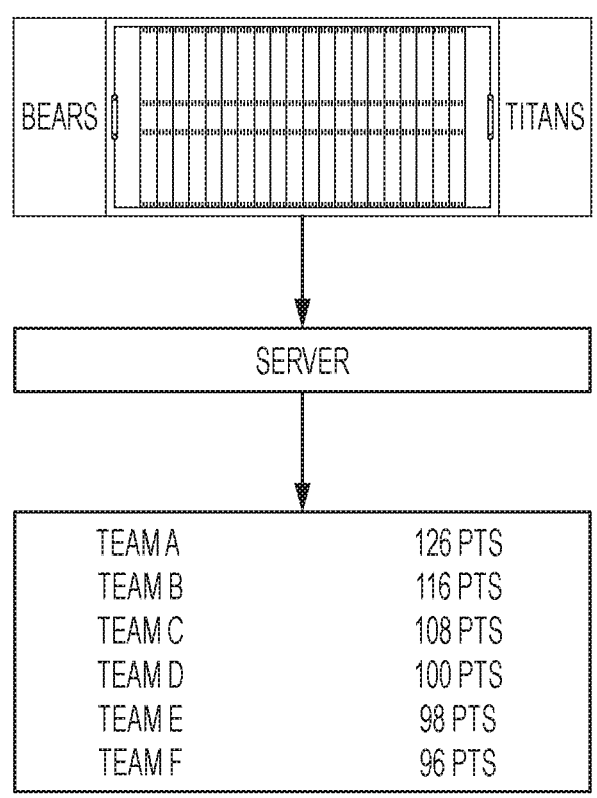
FIG. 9 is a diagram showing how the system is responsible for making available the live scoring of other contestants as well as any substitutions other contestants have made during the contest.
Figure 9B:
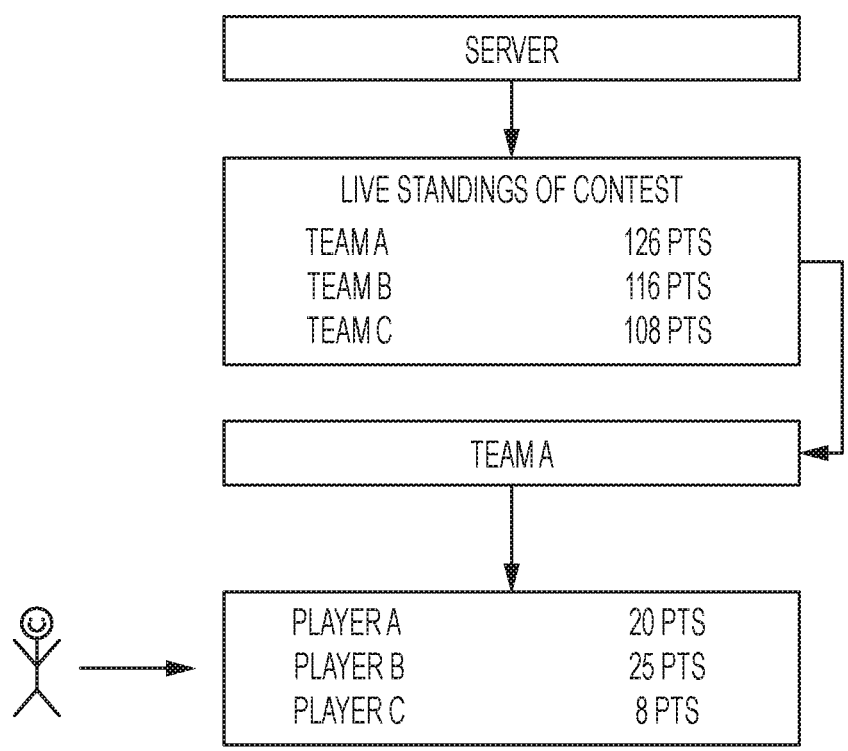
FIG. 9B is a diagram showing that based off of FIG. 9B the system makes each contestant's roster available at all time during the contest to be viewed by other participants.

3) The system is responsible for making live scores of each fantasy team available for view by all participants in real time (see FIG. 9 which shows the server tracking and updating the point values derived from an actual game). As shown in FIG. 9B the system derives a live scoring window for each player (e.g., Player B) and makes it available for view by each contestant.

4) The system is responsible for implementing all substitutions made by each participant available for viewing by all participants in real time.

Figure 10:
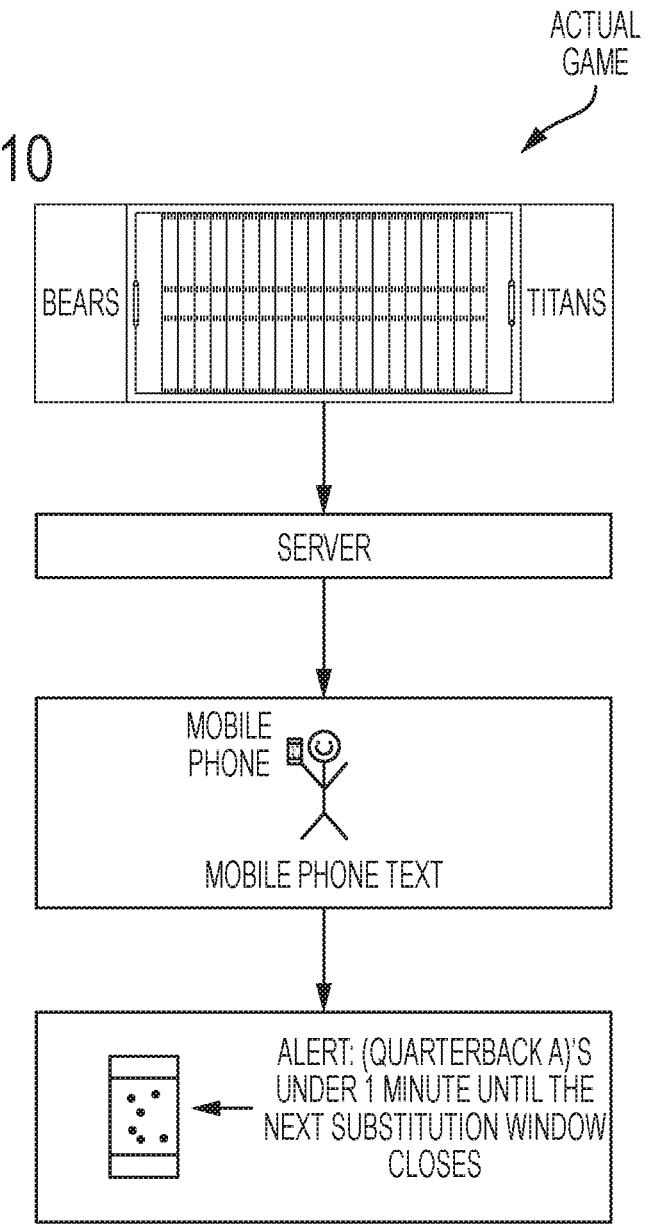
FIG. 10 is a diagram of how the system performs a live mobile alert.

5) The system is responsible for updating participants through text, email, etc. any changes for fantasy players on their roster including: injuries, weather changes, ejections, player performance statistics, as well as when a fantasy player's window for substitution is closing (i.e., less than two minutes left in a period, or if a golfer is on the putting green). FIG. 10 gives an example: Quarterback A is playing at 2:27 in the 4th quarter. The server notes that the substitution window is under 1 minute until the next substitution period ends (e.g., 2 min mark of 4th quarter). The system automatically sends an alert to the contestant's mobile phone.

6) The system is also responsible for making automatic substitutions (as an option) for players that have been determined to be injured and cannot return to the game, or ejected players as long as that players being substituted are eligible for that period (this is done on a "random number" basis from the eligible pool of players (see FIG. 4B).

Figure 11:
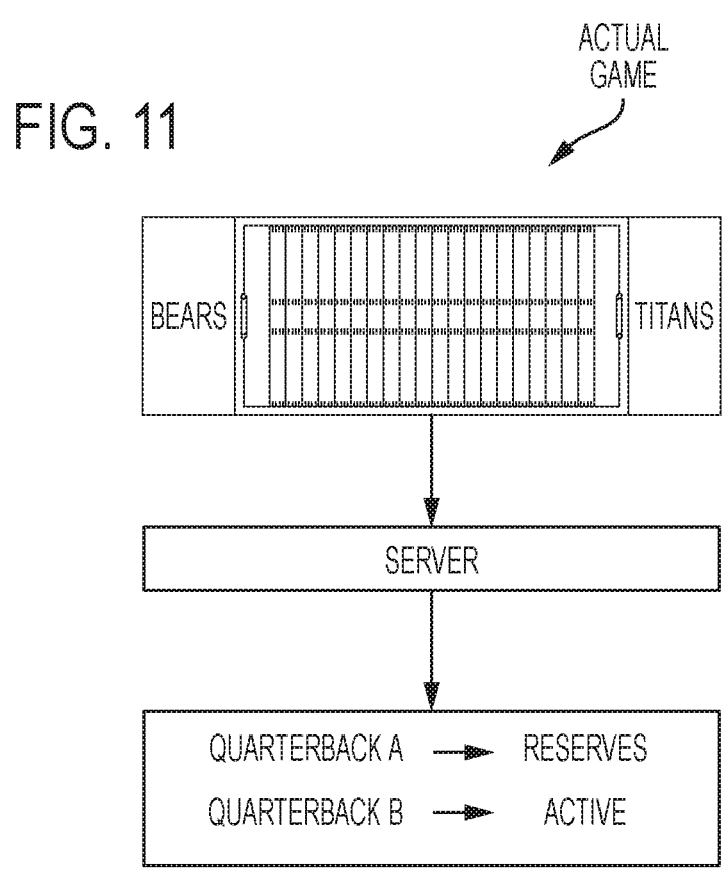
FIG. 11 is a diagram showing how the system monitors the game clock and makes predetermined substitutions that have been chosen in advance by the contestant.

7) The system is responsible for making predetermined substitutions directed by fantasy owners, even before games have begun (see FIG. 11 and FIG. 6B as well). FIG. 11 a situation where the real game clock reads 0:00 at the end of the $2^{nd}$ quarter. The contestant has predetermined that there would be a Quarterback A for Quarterback B at this time. The system detects that the $2^{nd}$ period has ended and makes the substitution.

Figure 12:
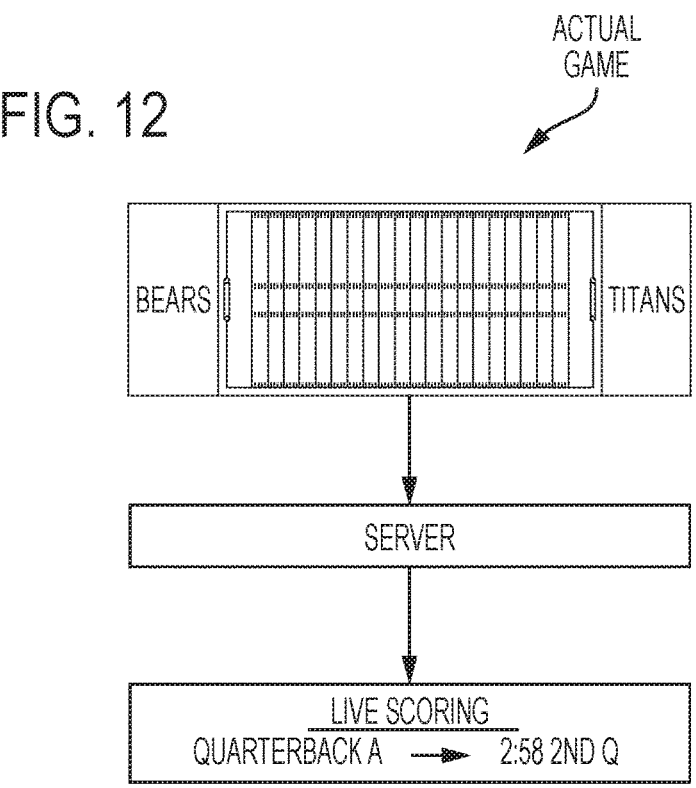
FIG. 12 is a diagram showing another option for contestants being alerted when a player's window for substitution is nearing an end. In this example.

8) Each league or contest has a "live scoring window" generated by the system that makes available on a computer, tablet, mobile device (or other computing device) a team's (and individual player's) fantasy points in real time. Contestants monitor this window to track how their team and players are performing. The system is also responsible for highlighting a player in the live scoring window when their substitution window is closing (see system responsibility #5) FIG. 12 shows an example where the system highlights a player's name in the live scoring window when the player gets within one minute of a substitution period. In the real game the clock reads 2:58 $2^{nd}$ quarter with Quarterback A playing. The system "realizes" that the clock is within 1 min of the next eligible substitution period. The system alerts the contestant by highlighting Quarterback A in the Live Scoring Window—which highlight will remain until the substitution period is over.

Some Fantasy Leagues make things more interesting by allowing "Drafts" during the season. One of ordinary skill in the art will recognize that a "Draft" during the season is actually a "Substitution" but on a more permanent basis. Therefore, "Drafts" can be handled in virtually the same way as explained above for substitutions. In a head to head format, each week, each contestant will draft a new team. Every player is available regardless of the other teams in the league. The system is organized as a two team draft. The actual number of players drafted and the number of reserves will depend on the particular fantasy league rules. The team that wins "the toss of the coin" gets to draft first. The draft order will then be as follows: TEAM A (won the toss) Draft order: 1,4,5,8,9, etc. TEAM B (lost the toss) Draft Order: 2,3,6,7,10,11, etc.

To make things interesting, teams will only be allowed to draft a given player a restricted number of time throughout the fantasy year. This will be decided by teams within fantasy league rules. In other words, if the rule is no more than two times per player then if TEAM A drafts a player (e.g., Tom Brady) in week 1 and in week 2, that player will no longer be available to draft by that team for the remainder of the fantasy season.

Figure 13:
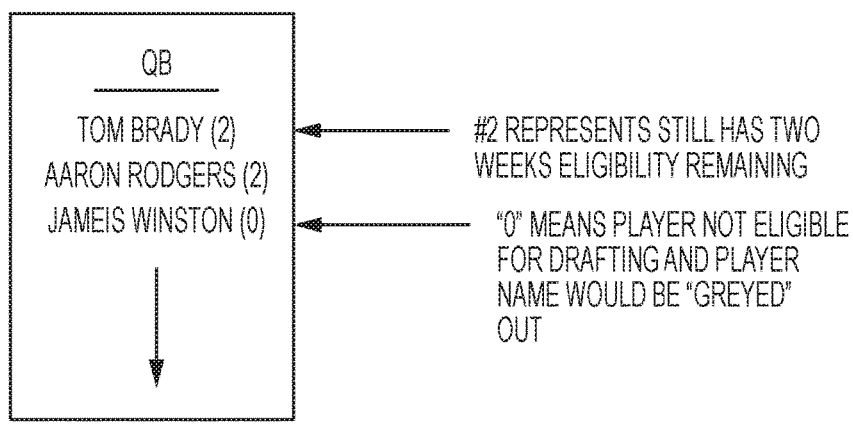
FIG. 13 is a diagram showing how Drafts after the start of the season are implemented.

Therefore, teams will need to plan wisely as to which weeks are best to draft certain players. The two teams will agree upon a scheduled draft time and date that week before the games begin. Drafts will be very fast and efficient since only two teams are drafting. In this head to head format, teams playing each other that week can also agree upon a side "purse". The winner that week receives the side purse. FIG. 13 illustrates the foregoing.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. An online fantasy sport system for implementing real time contestant interaction comprising:
   a network attached server for performing the tasks of:
      maintaining active player rosters and reserve player rosters of a fantasy team for a plurality of contestants;

providing a roster function so that contestants can access the system over the network to establish and modify their active player rosters and reserve player rosters;

enabling real-time player substitutions by allowing a contestant to move a substitute player on their reserve player roster for to their active player roster, replacing a player thereon;

executing a rule set for each fantasy sport, which rule set controls player substitutions and score computations, wherein substitutions can be made at any time but the substitute player does not appear on the active player roster until the start of the next period of regulation play, wherein any players who have entered the final period of regulation play in their real games or have already completed their real games can't be substituted, and wherein total fantasy points for each fantasy team is an accumulation of the points earned in their real game by each fantasy player on the active player roster;

computing a current score earned by each fantasy team and making said score available over the network in real-time; and a network attached computing device for contestants for performing the tasks of:

accessing the network attached server so that contestants can establish and modify their active player rosters and their reserve player rosters;

substituting players in real-time by exchanging a player on their player roster for a player on their reserve player roster; and viewing the current score promulgated by the network attached server.

* * * * *